Nov. 1, 1955 R. W. ROSEL 2,722,237
PLASTIC PIPE WITH ATTACHED TENSILE LOAD-BEARING MEMBER
Filed March 31, 1953 2 Sheets-Sheet 1

INVENTOR.
Robert W. Rosel
BY
ATTORNEYS.

Nov. 1, 1955   R. W. ROSEL   2,722,237
PLASTIC PIPE WITH ATTACHED TENSILE LOAD-BEARING MEMBER
Filed March 31, 1953   2 Sheets-Sheet 2

INVENTOR.
Robert W. Rosel
BY
Corbett, Mahoney & Miller
ATTORNEYS

| United States Patent Office | 2,722,237
Patented Nov. 1, 1955 |

2,722,237

PLASTIC PIPE WITH ATTACHED TENSILE LOAD-BEARING MEMBER

Robert W. Rosel, Columbus, Ohio, assignor to Yardley Plastics Company, Columbus, Ohio, a corporation of Ohio Application March 31, 1953, Serial No. 345,951

2 Claims. (Cl. 138—56)

My invention relates to plastic pipe with attached tensile load-bearing member. It has to do, more particularly, with plastic pipe which is especially suitable for suspending a water pump in a well but is not limited to such specific use.

At present there is one type of deep well pump in use which is suspended in the well casing so that it will be submerged in the water column therein and will pump the water through an attached pipe to the surface. The pump is ordinarily suspended by means of the pipe and this pipe is usually of metal. Because plastic pipe is cheaper and is not subject to electrolytic corrosion by the water in the well, the use of plastic pipe is desirable in this type of installation. However, the usual relatively inexpensive extruded plastic pipe is not sufficiently strong to support the weight of the pump without elongation and rupture.

It is the main object of my invention to provide a plastic pipe which is not only suitable for the transmission of fluids but is suitable for simultaneously suspending a dead weight, such as the weight of a pump in a well to which it is connected.

Another object of my invention is to provide a plastic pipe of the type indicated which is provided with an attached tensile load bearing member that is independent of the wall of the pipe so that the bursting strength and other structural characteristics of the wall of the pipe will not be affected.

Another object of my invention is to provide a plastic pipe with the attached tensile member which may be of a continuous length of a flexible metal member but yet which is completely protected from electrolytic corrosion.

Another object of my invention is to provide a plastic pipe of the type indicated which can be cut easily into desired lengths with simple tools and which is of such a nature that the ends of the metal tensile member can be bared at the ends of the desired length of pipe to permit attachment of such member to the desired units.

Another object of my invention is to provide a plastic pipe of the type indicated wherein the tensile load-bearing member is so arranged and attached to the pipe that it will not interfere with the extrusion of the pipe by the usual extrusion methods.

According to my invention I provided a plastic pipe which has an exterior rib extending longitudinally thereof and attached integrally to the periphery thereof. In this rib there is embedded a continuous flexible metal tensile member which extends the full length of the pipe but is completely independent and completely outside the wall of the pipe.

The preferred embodiment of my invention is illustrated in the accompanying drawings wherein similar characters of reference designate corresponding parts and wherein.

Figure 1:
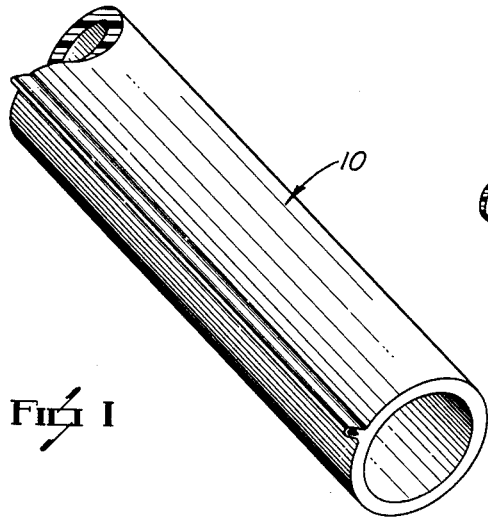
Figure 1 is a perspective view of a section of the plastic pipe which has, according to my invention, the tensile member attached thereto.
Figure 2:
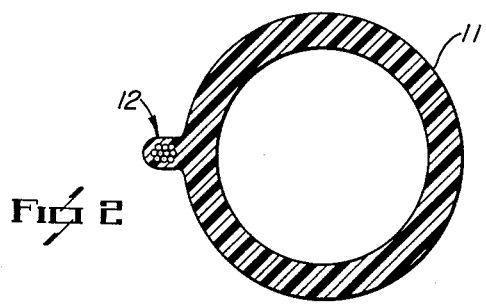
Figure 2 is a transverse sectional view of the pipe of Figure 1.
Figure 3:
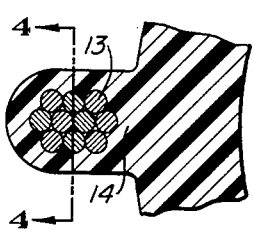
Figure 3 is a detail in enlarged transverse section showing the rib in which the tensile member is embedded.
Figure 9:
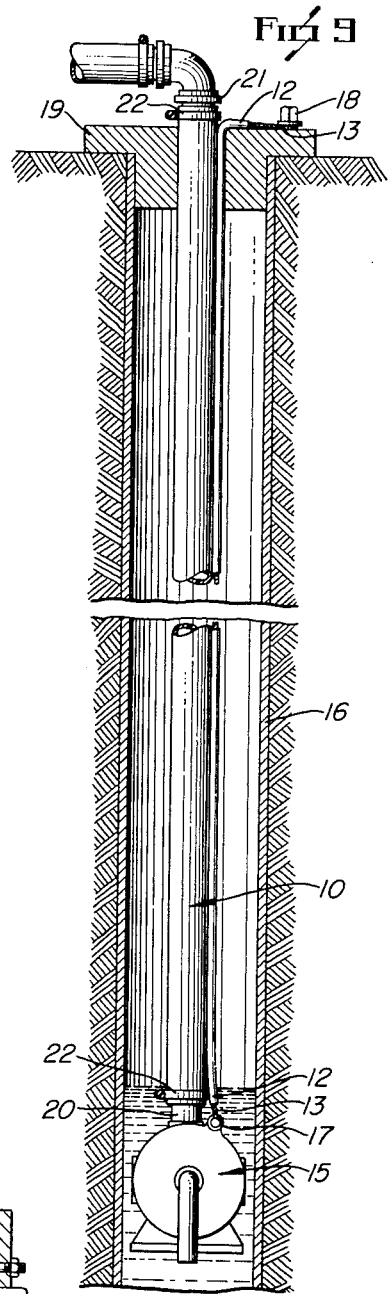
Figure 9 is a diagrammatic view giving one example of the use of my plastic pipe, showing it incorporated in a well installation.

With reference to the drawings, in Figures 1, 2 and 3, I have illustrated the structure of my pipe. The pipe shown is especially suitable for use in a water well installation where the pump is suspended in the well casing by the pipe which is connected thereto and through which the water is pumped to the surface. Such an installation is illustrated in Figure 9.

My pipe is formed from a thermoplastic resin material. I prefer to use polyethylene material although other materials having the desired flexibility, and resistance to rot, rust and electrolytic corrosion can be employed. The pipe can be extruded in the usual way and, therefore, can be produced economically.

In the form of the pipe shown, which is indicated generally by numeral 10, the main wall is of circular cross-section. The circular wall 11, which is extruded solely from the resin material, is free of any reinforcement. It will, therefore, have the structural characteristics of the usual extruded plastic pipe of comparable diameter, wall thickness, and material.

In order to give the pipe the required tensile strength, a rib 12 is formed on the exterior thereof and extends the full length thereof. In this rib, there is embedded a tensile member which is shown as a cable 13 formed from a bunch of twisted steel wires. The cable is fed continuously into the extrusion die as the plastic material is extruded therefrom. Thus, the formation of the rib 12, with the embedded cable 13, will not interfere with the extrusion of the pipe according to the usual methods. It will be noted, from the sectional views of Figure 2 and 3, that the rib section extends radially from the outer periphery of the pipe wall to which it is attached by the thin section of plastic material 14 which is between the pipe wall 11 and the cable 13. The cable 13 is completely enclosed within the rib 12 for protection against water and air which would cause corrosion thereof. This cable 13 will function to give the pipe the desired tensile strength. However, it will be noted that the cable 13 is completely within the rib 12 which is located completely outside the outer periphery of the wall 11 of the pipe, so that no structural characteristics of the wall 11 will be changed by the rib-embedded cable. The cable 13 will function as a tensile member without having any effect on the bursting strength or other characteristics of the circular wall 11 of the pipe. Any elongated reinforcing embedded in the pipe wall 11, especially if the wall is formed of polyethylene material, would reduce its bursting strength.

In the installation shown in Figure 9, a pump 15 is suspended by means of a length of my pipe 10 in the well casing 16, the pump being submerged in the water in the casing. A short length of the cable 13 is exposed at the lower end of the pipe and is anchored to a loop 17 on the pump. At the upper end of the pipe another short length of the cable 13 is exposed and is anchored to a bolt 18 on a supporting member 19 at the surface. All of the weight of the pump 15 will, consequently, be supported by the cable 13 and there will be no tensile strain on the wall 11 of the pipe. The ends of the circular wall 11 of the pipe may be attached to the proper fittings 20 and 21, respectively, by the usual clamping collars 22.

Figure 5:
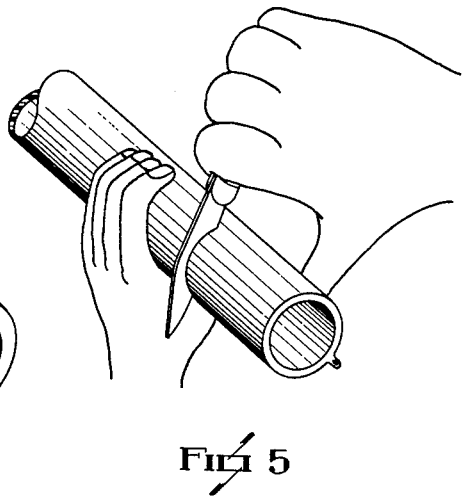
Figure 5 is a perspective view illustrating how the pipe may be cut transversely near its end as the first step in baring the tensile member at the end of the pipe.
Figure 6:
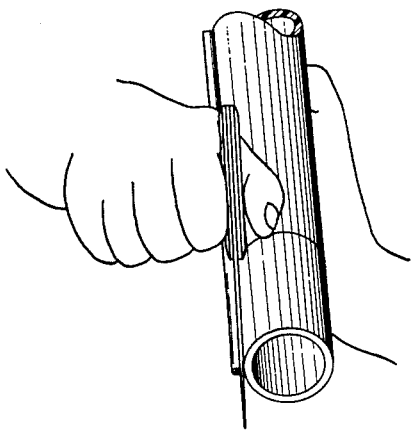
Figure 6 is a perspective view showing how the transversely severed end length of pipe is cut from the rib.
Figure 4:
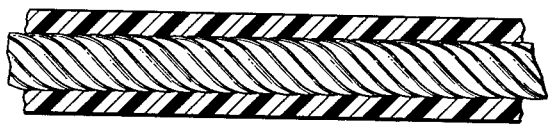
Figure 4 is a longitudinal sectional view through the rib and tensile member taken along line 4—4 of Figure 3.
Figure 7:
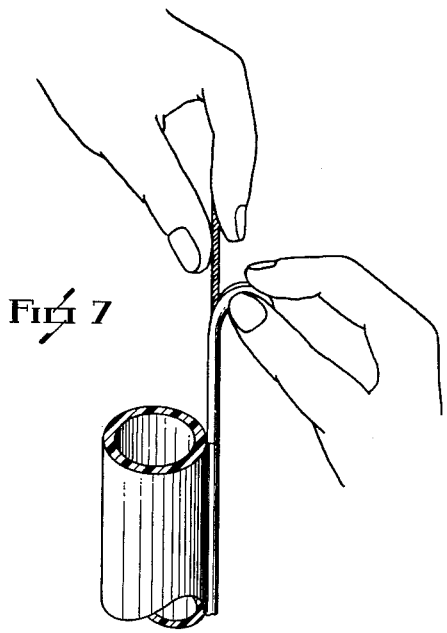
Figure 7 is a perspective view illustrating the step of stripping the rib material from the tensile member.
Figure 8:
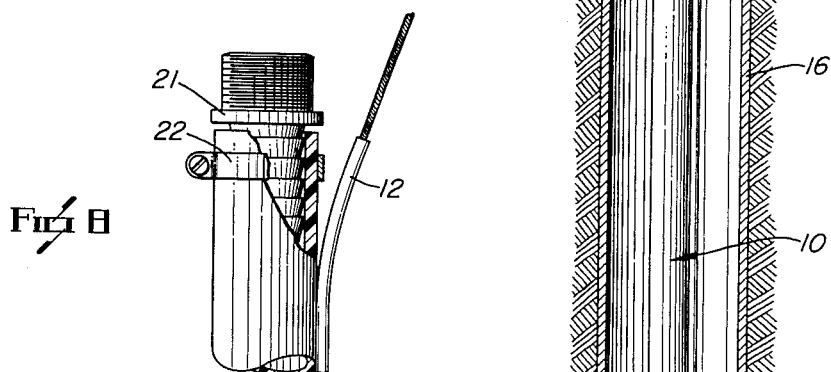
Figure 8 shows the condition of the end of the pipe for receiving the indicated fitting.

In preparing the pipe for attachment to the fittings, a small length of the circular wall of the pipe is removed at each end thereof, without cutting off the corresponding length of the rib 11 as shown in Figure 5. This may be done with a simple penknife by cutting the pipe transversely at the desired distance from the end. Then, as shown in Figure 6, the knife is used to cut the transversely severed length of pipe from the rib 12. Then the plastic material of the rib may be slit longitudinally and be stripped from the cable 13, as shown in Figure 7, for the desired distance. To permit insertion of a fitting 21, as shown in Figure 8, and application of a collar 22 at the end of the pipe, the rib 12 should be severed from the wall of the pipe down beyond the end of the pipe but the rib material need not be stripped from the cable except only so far as is necessary to permit anchoring of the cable 13. The rib 12 can be separated from the pipe without damage to the exterior surface thereof. In all cases, a minimum amount of the plastic should be stripped from the cable to avoid corrosion and it is preferable to tape or otherwise protect the exposed anchored part of the cable from corrosion.

If a desired length of pipe is to be cut completely from a long length or roll of the pipe, the plastic material of the wall 11 and rib 12 is cut through with a knife in a manner similar to Figure 5 and then wire cutters are used for severing the cable 13 at that point.

Figure 10:
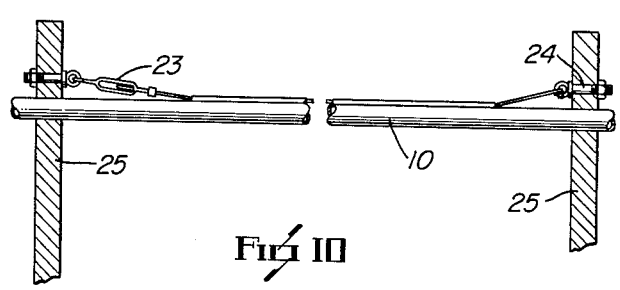
Figure 10 shows the pipe in horizontal position with the tensile member anchored at its ends to support it.

In Figure 10 I have illustrated how the pipe 10 can be supported horizontally. The ends of the cable are exposed and anchored to a turnbuckle 23 and a bolt 24, respectively, which are carried by suitable vertical supports. Here again a minimum amount of the cable is exposed at the ends of the pipe and such exposed portions should be protected from corrosion. In this example, the load on the pipe, that is its own sagging weight, is carried by the cable 13.

It will be apparent from the above that the attached tensile member will be flexible and will not interfere with bending the pipe to roll long lengths of the pipe into rolls, to curve the pipe around corners, etc. The tensile member will have no effect on the bursting strength or other usual structural characteristics of the pipe, but will serve to provide an attached member to bear the weight of the associated load. Also, the tensile member will not interfere with producing the pipe by the usual extrusion methods. Furthermore, the tensile member, when of metal cable, will further serve as a ground wire. This is advantageous and necessary in many installations since plastic pipe is a non-conductor of electrical current.

Having thus described my invention, what I claim is:

1. In combination, a unit suspended by means of a plastic pipe adapted to conduct fluid to and from said unit, said plastic pipe being formed of flexible material and comprising a wall having an integral exterior rib extending longitudinally thereof, a flexible metal tensile load-bearing member embedded in said rib and extending continuously the length thereof, said tensile member being completely outside the wall of said pipe and being separated from the wall of the pipe by a section of the material of the rib to aid in severance of a section of the rib from the pipe so as to provide for exposure of the ends of the tensile member and said tensile member being removed from a portion of the rib at both its ends with its lower end being anchored to said unit and its upper end being anchored to a suitable support from which the unit is suspended.

2. In a plastic pipe installation where the pipe is adapted to conduct fluid, said plastic pipe being formed of flexible material and comprising a wall having an integral exterior rib extending longitudinally thereof, a flexible metal tensile load-bearing member embedded in said rib and extending continuously the length thereof, said tensile member being completely outside the wall of said pipe and being separated from the wall of the pipe by a section of the material of the rib to aid in severance of a section of the rib from the pipe, said tensile member being removed from a portion of the rib at both its ends with such ends anchored to suitable supports.

References Cited in the file of this patent

UNITED STATES PATENTS

| | | |
|---|---|---|
| 1,736,094 | Schmidt | Nov. 19, 1929 |
| 2,090,127 | Keegan | Aug. 17, 1937 |
| 2,136,230 | Berman et al. | Nov. 8, 1938 |
| 2,350,158 | Evans | May 30, 1944 |
| 2,619,125 | Eickmeyer et al. | Nov. 25, 1952 |